United States Patent
Shane

(10) Patent No.: US 6,568,661 B1
(45) Date of Patent: May 27, 2003

(54) DIFFUSER FOR USE IN A CARBONIC ACID CONTROL SYSTEM

(75) Inventor: Tommy J. Shane, Loganville, GA (US)

(73) Assignee: Tomco$_2$ Equipment Co., Loganville, GA (US)

( * ) Notice: Subject to any disclaimer, the term of this patent is extended or adjusted under 35 U.S.C. 154(b) by 0 days.

(21) Appl. No.: 09/848,626

(22) Filed: May 3, 2001

(51) Int. Cl.$^7$ .................................................. B01F 3/04
(52) U.S. Cl. ......................... 261/77; 261/93; 261/121.1
(58) Field of Search .............................. 261/77, 84, 89, 261/91, 93, 121.1

(56) References Cited

U.S. PATENT DOCUMENTS

| | | | | |
|---|---|---|---|---|
| 1,312,754 A | * | 8/1919 | Roward | 261/93 |
| 1,350,605 A | * | 8/1920 | Greenawalt | 261/93 |
| 1,374,499 A | * | 4/1921 | Greenawalt | 261/93 |
| 1,583,141 A | * | 5/1926 | Greenawalt | 261/93 |
| 1,921,220 A | * | 8/1933 | Daman | 261/93 |
| 2,124,707 A | * | 7/1938 | Newton et al. | 261/77 |
| 2,521,396 A | * | 9/1950 | Moul | 261/93 |
| 3,202,281 A | * | 8/1965 | Weston | 261/93 |
| 5,198,156 A | * | 3/1993 | Middleton et al. | 261/93 |
| 5,487,835 A | | 1/1996 | Shane | 210/74.9 |
| 5,514,264 A | | 5/1996 | Shane | 210/96.1 |

FOREIGN PATENT DOCUMENTS

| | | | | |
|---|---|---|---|---|
| CZ | 74874 | * | 2/1944 | 261/93 |
| DE | 900087 | * | 12/1953 | 261/93 |

OTHER PUBLICATIONS

U.S. patent application Ser. No. 10/269,735, Shane.
U.S. patent application Ser. No. 10/269,433, Shane.
U.S. patent application Ser. No. 10/269,369, Shane.

* cited by examiner

Primary Examiner—C. Scott Bushey
(74) Attorney, Agent, or Firm—Thomas, Kayden, Horstemeyer & Risley, LLP; Todd Deveau

(57) ABSTRACT

A diffuser for use in a pressurized feed system. The diffuser introduces a carbonic acid solution into water to be treated. The carbonic acid solution within the diffuser is maintained at an elevated pressure. As the carbonic acid solution passes to the exterior of the diffuser, the pressure drop causes an effective mixing of the carbonic acid solution and the water. The carbonic acid solution mixes with the water and the pH of the water is reduced.

4 Claims, 4 Drawing Sheets

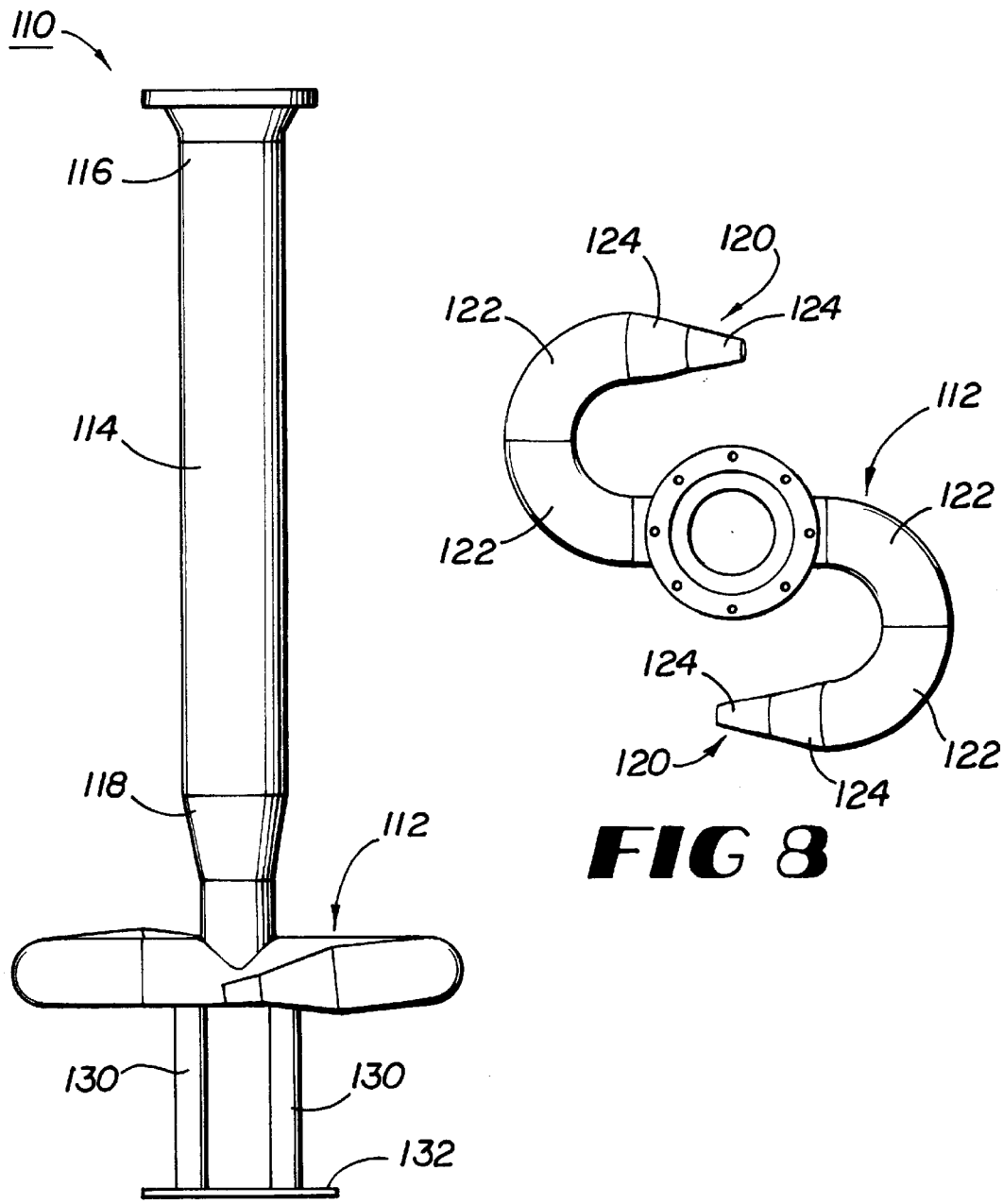

DIFFUSER FOR USE IN A CARBONIC ACID CONTROL SYSTEM

TECHNICAL FIELD

The present invention relates to pressurized feed systems to treat water and, more particularly, relates to introducing $CO_2$ into the water to reduce the pH.

BACKGROUND OF THE INVENTION

Raw water may be treated by any number of ways to obtain a final treated water product. However, the final treated water product may have a pH level unsuitable for commercial or consumer requirements. Typically, a final treated water product requires a pH level of less than 9. One method for lowering the pH level in water is to inject $CO_2$ into the water by a direct gas feed system. The $CO_2$ is passed through a diffusion system in a recarbonated basin. This diffusion system is commonly referred to as a bubbler. Another method for injecting carbon dioxide into water is to aspirate the carbon dioxide with a venturi. An apparatus using a venturi is sometimes also referred to as a diffuser.

In either method of introducing $CO_2$ into water, the $CO_2$ is introduced into a carrier solution to form a carbonic acid solution. To keep the $CO_2$ in solution and prevent the formation of gas bubbles in the system, the carbonic acid solution is maintained at an elevated pressure. Diffusers are engineered to maintain the system pressure and to distribute the carbonic acid solution into the water being treated. As the pressurized carbonic acid solution is introduced into the water being treated, the $CO_2$ expands and is released and mixed into the stream of water.

An example of a known diffuser is disclosed in my U.S. Pat. No. 5,487,835, the entire disclosure of which is incorporated herein by reference. In my '835 patent, the diffuser 71 has three rectangular sides defining a triangular prismatic structure. The diffuser 71 is inserted normal to the direction of flow of the water stream. The carbonic acid solution is passed through one end of the diffuser 71. While the carbonic acid solution is within the diffuser 71, the diffuser 71 maintains the elevated pressure of the carrier solution forcing the formation of carbonic acid and excess $CO_2$, if any, to remain in the carbonic acid solution.

The diffuser 71 has a plurality of outlet holes on two of the rectangular sides. The plurality of holes face upstream while the third rectangular side faces down stream. The passing of the carbonic acid solution through the plurality of holes forces the $CO_2$, if any, to be released into the stream of water to reduce the pH. The downstream positioning of the third side without the holes creates a vortex in the stream of water which creates additional mixing.

SUMMARY OF THE INVENTION

The present invention provides an apparatus for adjusting the pH of water using a carbonic acid solution. The diffuser of the present invention maintains the system back pressure when processing the carbonic acid solution and dispenses the $CO_2$, if any, to adjust the pH of the water being treated.

In one embodiment of the present invention, the diffuser includes an injector for injecting the carbonic acid solution into a receiver tank. Centrally located within the interior of the receiver tank is a driven impeller. The injector directs the carbonic acid solution towards the impeller. The rotation of the impeller causes the carbonic acid solution and the water within the receiver tank to commingle.

According to another embodiment of the invention, a diffuser of the present invention includes an annular cylinder with a hollow formed therein. A solution inlet permits carbonic acid solution into the annular cylinder. The annular cylinder defines an interior path leading from the inlet, through the hollow, and back to the inlet. A plurality of outlet holes are formed in an upper side of the annular cylinder. The outlet holes permit the carbonic acid solution to flow from the hollow to the exterior of the annular cylinder.

In still another embodiment of the present invention, a diffuser of the present invention includes an elongated body having a hollow therethrough. One end of the elongated body includes an end plate over the hollow. The end plate defines an obround outlet for permitting carbonic acid solution to pass into the water to be treated. The obround outlet is shaped to direct the solution in a particular manner.

In yet another embodiment of the present invention, a diffuser of the present invention includes a pair of laterally displaced nozzles. The pair of nozzles extend into a mixing cylinder and are fixed in a stationary position. The nozzles are oppositely-oriented relative to one another to direct carbonic acid solution passing through each of the nozzles in opposite directions which causes the water and the solution to circulate in the mixing cylinder.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 7 illustrates a side view of another embodiment of a diffuser of the present invention having a pair of laterally displaced nozzles adapted to be positioned in a fixed manner in a mixing cylinder.

FIG. 8 illustrates a bottom view of the diffuser of FIG. 7.

DETAILED DESCRIPTION

Figure 1:
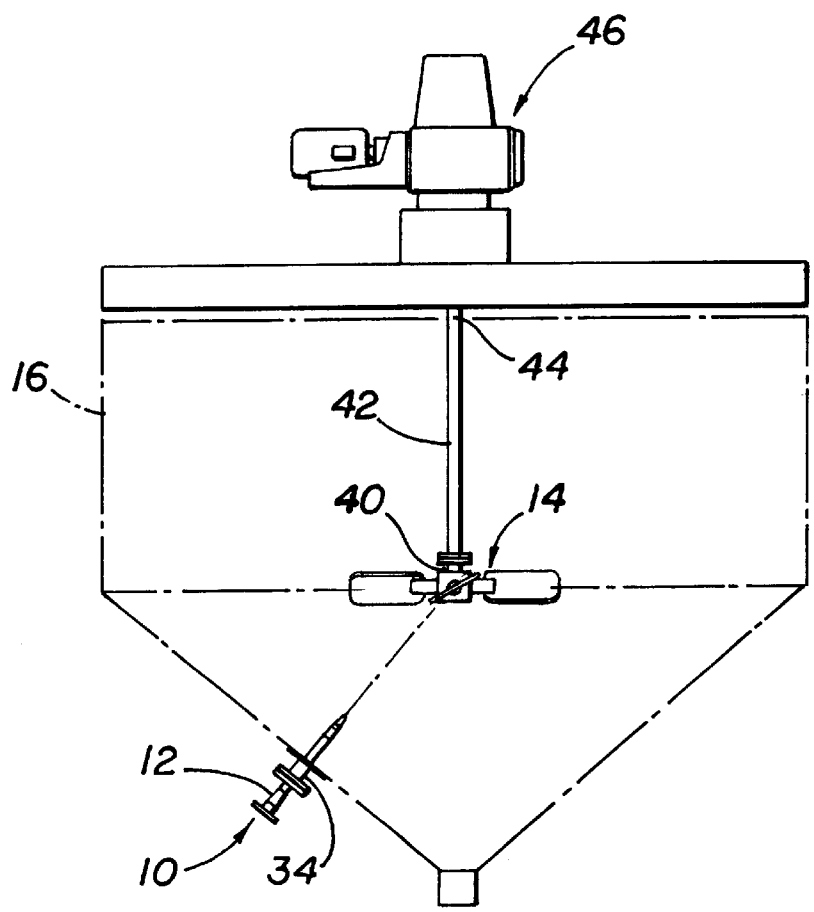
FIG. 1 illustrates a front view of one embodiment of a diffuser assembly of the present invention having an injector for directing solution at an impeller.

Referring now to the drawings in which like numerals indicate like elements throughout the several views, the drawings illustrate exemplary embodiments of the present invention.

In FIG. 1, a diffuser assembly 10 includes an injector 12 for use with a receiver tank 16. The receiver tank is also commonly referred to as a mixing tank 16. Within the receiver tank 16 is a motor driven impeller 14. The injector 12 and impeller 14 are preferably made of type 304 stainless steel. Preferably, a pair of injectors 12 are used with a pair of receiver tanks 16 in a single operation. The injectors 12 in the receiver tanks 16 are assembled alongside one another and operate in a toggling manner. One injector 12 in one receiver tank 16 processes water while the second injector 12 in the second receiver tank 16 is temporarily isolated.

Figure 2:
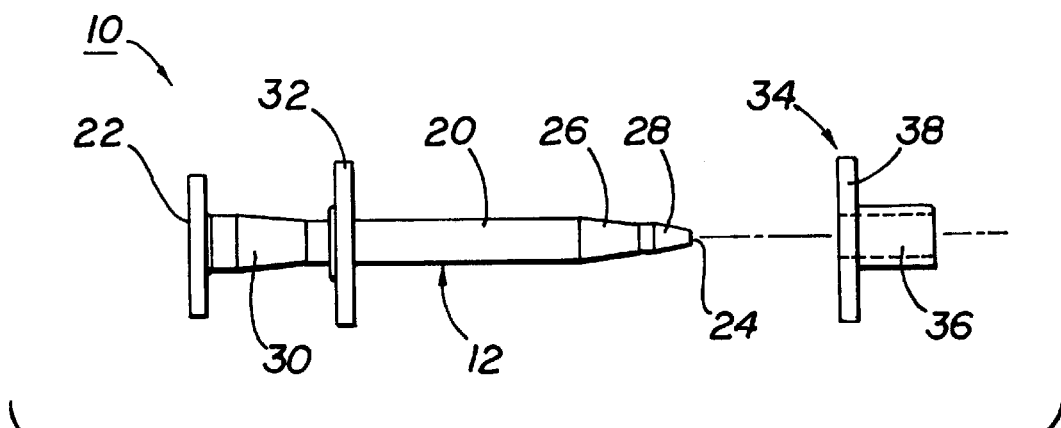
FIG. 2 is a close-up view of the injector of FIG. 1.

As shown in FIG. 2, the injector 12 includes an elongated member 20 having a solution inlet end 22 and a solution outlet end 24. The outlet end 24 includes a pair of aligned concentric reducers 26 and 28. The inner diameter of the narrower reducer 28 is preferably approximately $33/64$ inches, but may be varied according the specifications of the impeller 14 and the receiver tank 16. Preferably, the pressure drop through the injector 12 is approximately 44 to 55 psi. An additional reducer, such as concentric reducer 30 may also be used as part of the injector 12. The bores of each of the reducers 26, 28 and 30 are aligned with one another to permit each reducer to cooperate with one another to direct the flow of solution through the injector 12 into a stream generally directed at the impeller 14.

The injector 12 further includes an outwardly extending flange member 32 spaced between the inlet and outlet ends 22, 24 which is used to connect the injector 12 to the receiver tank 16 as explained below. The diffuser assembly 10 also includes an injector support 34 having an concentric collar 36 configured to surround a mid-portion of the injector 12 and a second outwardly extending flange member 38 mounted to the collar 36. The injector 12 is adapted to be received in an opening in the side wall of the receiver tank 16 to permit the solution to pass from the exterior to the interior of the receiver tank 16. The flange member 32 of the injector 12 and the flange member 36 of the injector support 34 abut against one another to retain the injector 12 in the receiver tank 16. Preferably, the injector 12 is tapped into the side wall of the receiver tank 16.

The impeller 14 is multi-vaned and is centrally supported within the receiver tank 16 on a distal end 40 of a drive shaft 42. The drive shaft 42 is coupled to an electric motor which drives the impeller 14. The vanes of the impeller are oriented to rotate generally about the centerline of the receiver tank 16. The radial-length of each of the vanes is preferably substantially smaller than the radius of the receiver tank 16. A proximal end 44 of the drive shaft 42 is supported through the top of the receiver tank 16 by inlet assembly 46. The injector 12 is positioned in the side wall such that the longitudinal center line of the injector 12 is approximately aligned with the distal end 40 of the drive shaft 42.

During operation of the diffuser assembly 10, the water is received into the receiver tank 16 through inlet assembly 46. Concurrently, the injector 12 injects the carbonic acid solution into the receiver tank 16. As the water accumulates in the receiver tank 16, the carbonic acid solution from the injector 12 is aimed at the rotating impeller 14. The rotation of the impeller 14 causes the solution and the water to be commingled. As the solution and the water is commingled, the carbonic acid with excess $CO_2$, if any, mixes with the water, thus reducing the pH of the water in the receiver tank 16.

Figure 3:
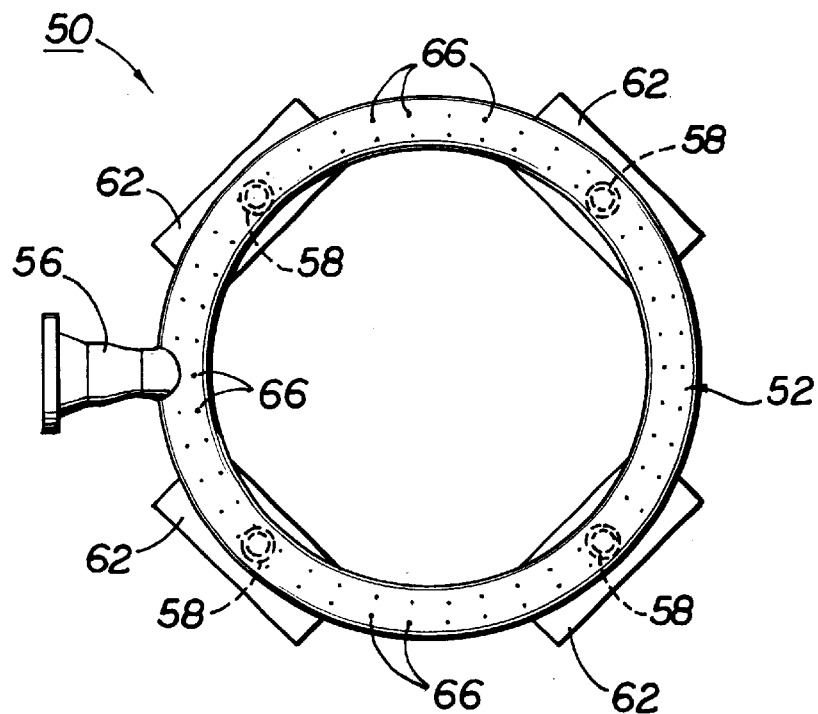
FIG. 3 illustrates a top view of another embodiment of the present invention having an annular cylinder with a plurality of outlet holes formed in an upper side of the annular cylinder.
Figure 4:
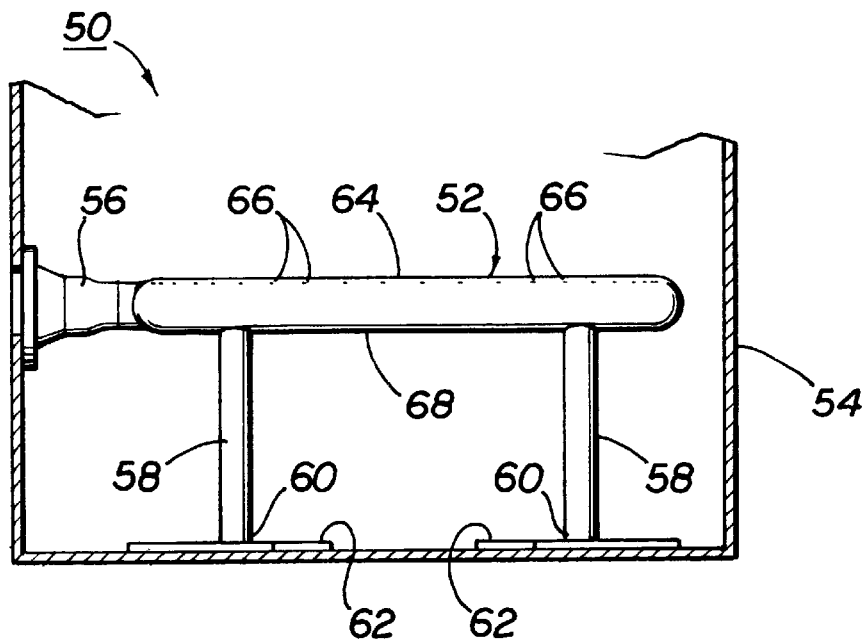
FIG. 4 is a side view of the diffuser shown in FIG. 3.

As shown in FIGS. 3 and 4, another diffuser 50 of the present invention is shown. The diffuser 50 is for use within a mixing chamber 54 and includes an annular cylinder 52 having a hollow therethrough. A carbonic acid solution inlet 56 is attached to a portion of the exterior circumference of the annular cylinder 52. The cylinder 52 and solution inlet 56 are preferably made of type 304 stainless steel. The cylinder 52 defines an interior path from the solution inlet 56, through the hollow, and back to the solution inlet 56.

The cylinder 52 is oriented in the bottom of the mixing chamber 54 to permit the flow of excess $CO_2$ upward to the top of the mixing chamber 54. Preferably, the $CO_2$ flows upward along substantially the entire height of the mixing chamber 54. Elongated mounting members 58 act as legs to support the cylinder 52 and extend from an underside 68 of the cylinder 52. Preferably, the elongated mounting members 58 are spaced equidistant apart from one another as best shown in FIG. 3. At distal ends 60 of the elongated members 58 are mounting plates 62 for mounting the diffuser 50 with fasteners (not shown) to a surface within the mixing chamber 54. The mounting plates 62 are also best shown in FIG. 3. The elongated members 58 and mounting plates 62 are also preferably made of type 304 stainless steel.

An upperside 64 of the cylinder 52 includes a plurality of outlet holes 66. The outlet holes 66 are preferably spaced equidistant apart and allow the carbonic acid solution to pass from the hollow of the cylinder 52 to the exterior of the cylinder 52 in an even manner.

In operation, the carbonic acid solution is pumped under pressure into the cylinder 52 through the solution inlet 56. The carbonic acid solution circulates under pressure through the entire length of the path through the hollow. As the carbonic acid solution circulates, portions of the carbonic acid solution pass through the outlet holes 66 in the upperside 64 of the cylinder 52. As the carbonic acid solution passes through the outlet holes 66, the pressure of the carbonic acid solution drops causing excess $CO_2$, if any, to be forced from the carbonic acid solution. Preferably, the pressure drop is approximately 45 to 55 psi. The carbonic acid solution mixes with the water being treated in the mixing chamber 54.

Figure 5:
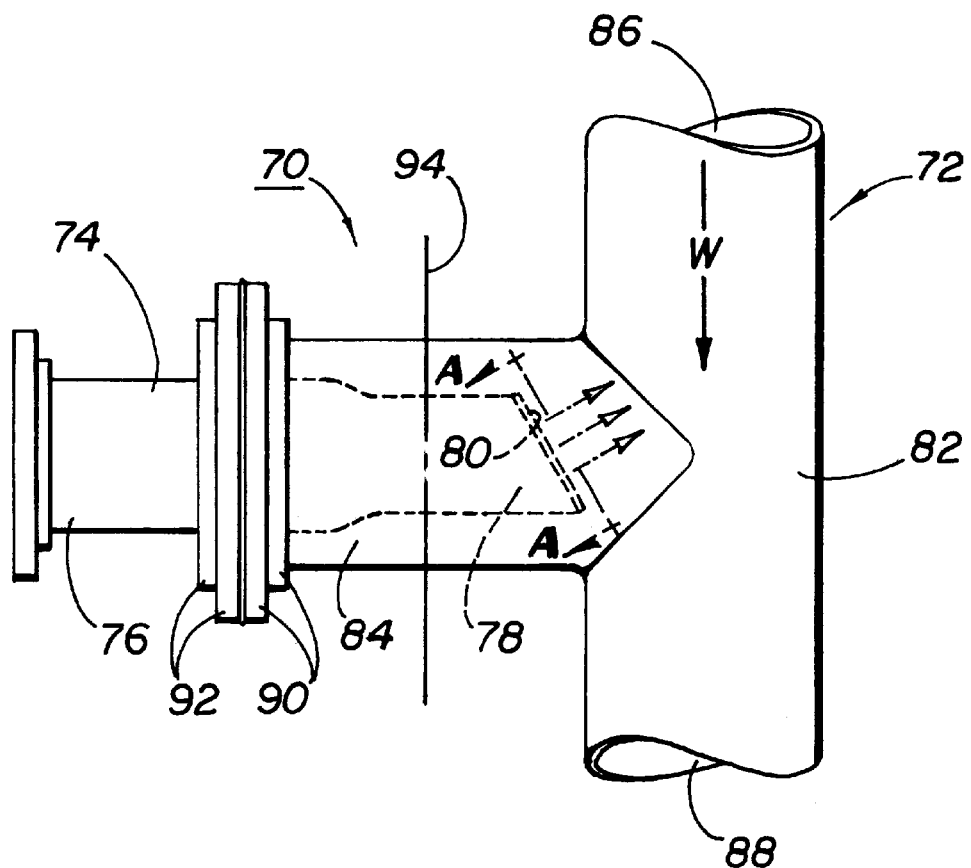
FIG. 5 is a front view of another embodiment of a diffuser of the present invention having an elongated hollow body, with an obround outlet at one end, positioned within a T-shaped pipe section.
Figure 6:
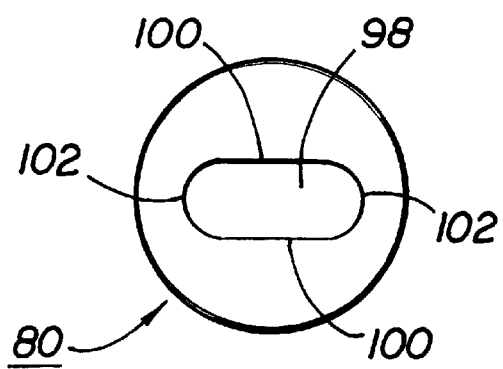
FIG. 6 illustrates a cross-sectional view taken along the line A—A of FIG. 5.

FIGS. 5 and 6 illustrate another diffuser 70 of the present invention intended for use with the dirtiest water. The diffuser 70 is preferably used in combination with a T-shaped pipe section 72. The diffuser 70 also defines a hollow and includes an elongated body 74 having first and second ends 76 and 78, respectively. An end plate 80 is fastened with fasteners (not shown) or welded to the second end 78 of the elongated body 74. A front view of the end plate 80 is shown in FIG. 6 and is described in greater detail below. The elongated body 74 and the end plate 80 are preferably made of type 304 stainless steel.

The T-shaped pipe section 72 includes a cross-through portion 82 and a leg portion 84. The cross-through portion 82 is also typically referred to as the top horizontal portion of a traditionally oriented letter "T". The leg portion 84 is then the vertically oriented portion of the letter "T". However, as shown in FIG. 5, the T-shaped pipe section 72 is set on its side and the leg portion 84 is then horizontally oriented.

In FIG. 5, the water being treated is represented by the arrow adjacent the reference letter W. This arrow indicates that the water W is passing through the cross-through portion 82 from a first end 86 to a second end 88 of the T-shaped pipe section 72. The diffuser 70 is secured at least partially within the hollow portion, on the center line, in the leg portion 84 of the T-shaped pipe section 72 such that the second end 78 of the elongated body 74 of the diffuser 70 is oriented toward the cross-through portion 82. In FIG. 5, a pair of mounting flanges 90 on the leg portion 84 abut a pair of mounting flanges 92 surrounding the diffuser 70. Fasteners (not shown) are used to secure the two sets of mounting flanges 90, 92 together.

As best shown in FIG. 5, the second end 78 of the elongated body 74 of the diffuser 70 is truncated. The second end 78 is truncated to orient the solution passing through the end plate 80 generally counter to the direction of flow through the cross-through portion 82 of the water being treated. However, in some cases, the end plate 80 may be oriented to direct the carbonic acid solution in the same direction as water W. For example, in FIG. 5, there is approximately a 30 degree angle between a vertical line (not shown) passing through the forward tip of the second end 78 and the end plate 80. This angle may be anywhere in the range of approximately 20 to 45 degrees. The second end 78 should not be parallel to a circle defined by a plane 94 intersecting the hollow in the leg portion 84 of the T-shaped pipe section 72. Three reference arrows are shown in FIG. 5 to indicate the general direction of the flow of solution from the end plate 80 of the diffuser 70.

FIG. 6 illustrates a view of the end plate 80 taken along line A—A in FIG. 5. The outer circumference of the end plate 80 is configured to conform to the second end 78 of the elongated body 74. The end plate 86 itself defines an obround outlet 98 therethrough. As used herein, the term "obround" means having at least two generally parallel or curved sides 100 and generally semicircular ends 102, quarter rounded ends, or curved corners. In other words, obround means having periphery segments with rounded intersections. The periphery segments on adjacent sides have unequal lengths, but the periphery segments which oppose one another are generally parallel and are of equal length. The term is thus intended to encompass closed figures having generally opposite sides with rounded corners, generally elliptical closed figures, and generally rectangular closed figures having rounded corners, for example quarter rounded corners. Accordingly, the term obround is meant to be interpreted broadly to cover shapes having cross sections that are generally rectangular, generally elliptical, or generally obround, but have rounded corners to facilitate fluid flow therethrough as described herein.

The obround outlet 98 is larger than the size of an outlet 66, described above, because the diffuser 70 is intended for use with dirtier water. As explained above, the obround outlet 98 directs the carbonic acid solution passing therethrough into a direction different from the path the solution had taken upon entering the diffuser 70. In particular, the solution upon passing through the obround outlet 98 is directed counter to the direction of the water W passing through the cross-through portion 82 of the T-shaped pipe section 72. As before, the carbonic acid solution enters the diffuser 70 under pressure, maintaining the $CO_2$ in the carbonic acid solution. As the carbonic acid solution emerges from the obround outlet 98, the resulting pressure differential effectively mixes the carbonic acid solution with the main water stream. Preferably, the pressure drop is approximately 45 to 55 psi. The excess $CO_2$ is released in generally a direction counter to the direction of the water W. The pH of the water passing through the cross-through portion 82 is reduced as a result of the introduction of the carbonic acid solution.

FIGS. 7 and 8 illustrate yet another diffuser 110 of the present invention. The diffuser 110 includes a pair of nozzles 112 laterally displaced from one another. The pair of nozzles 112 extend into the interior of a mixing cylinder (not shown) which is used for receiving the carbonic acid solution from the diffuser 110 and the water to be treated. An elongated body 114, having first and second ends 116 and 118, extends the pair of nozzles 112 into the mixing cylinder. The elongated body 114 includes a hollow therethrough for carrying the carbonic acid solution to the pair of nozzles 112. The nozzles 112 extend from the second end 118 in substantially a perpendicular manner and remain fixed in a stationary position within the cylinder. The pair of nozzles 112 do not rotate about a central axis of the elongated body 114. Distal ends 120 of the nozzles are substantially oppositely-oriented relative to one another to direct the solution passing through the nozzles 112 in opposite directions.

As best shown in FIG. 8, each nozzle of the pair of nozzles 112 is defined by elbow portions 122 and concentric reducers 124. In particular, each nozzle includes a pair of elbow portions 122 defining a semicircular portion. At an end of each semicircular portion is a pair of concentric reducers 124 aligned with one another to direct the solution.

In the preferred embodiment, the diffuser 110 further includes at least one support member 130 for additional structural support within the mixing cylinder and to prevent torque created by the pair of nozzles 112 from twisting the elongated body 114 from the top of the mixing cylinder. In FIG. 7, a pair of support members 130 extend downward from the pair of nozzles 112 and the second end 118 of the elongated body 114. A mounting flange 132 is then used to secure the support members 130 to the bottom of the mixing cylinder.

In operation, the carbonic acid solution coming from the pair of nozzles 112 causes the water and the carbonic acid solution to circulate in the mixing cylinder. Moreover, the carbonic acid solution enters the diffuser 110 under pressure and, as the solution passes through the pair of nozzles 112, the pressure differential causes excess $CO_2$ in the carbonic acid solution to burst forth. Preferably, the pressure drop is approximately 45 to 55 psi. The circulating of the carbonic acid solution with the water caused by the pair of nozzles 112, as well as the excess bubbles of $CO_2$ bursting forth, if any, results in the commingling of the carbonic acid solution and the water. The commingling of the carbonic acid solution, excess $CO_2$ and the water reduces the pH in the mixing cylinder.

In any embodiment of the present invention, the amount of $CO_2$ which can be mixed with the stream of water or a container of water to be treated at various temperatures and pressures is dependent on the performance characteristics of the $CO_2$ supply, the carbonic acid solution supply, and in particular, the performance characteristics of each of the diffusion systems as described above.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A diffuser assembly comprising:

an injector for injecting a solution into a receiver tank and for directing the solution from said injector towards an impeller, thereby causing the solution and the fluid within the receiver tank to commingle;

wherein the injector comprises:
an elongated member having inlet and outlet ends and at least one concentric reducer at said outlet end and an outwardly extending flange member spaced between said inlet and outlet ends to couple said injector to the receiver tank; and
an injector support at least partially defined by a concentric collar member for surrounding a portion of said injector and a second outwardly extending flange member mounted to said collar, said injector support and said injector configured to cooperate with one another to permit said injector to be received and retained in a side wall of the receiver tank to permit the solution to pass from the exterior to the interior of the receiver tank, said second outwardly extending flange member of said injector support configured to abut against said outwardly extending flange member of said injector when said injector is retained in the receiver tank.

2. A diffuser assembly comprising an injector for injecting a pressurized carbonic acid solution into a receiver, said injector comprising an elongated member having inlet and outlet ends and at least one concentric reducer at said outlet end, wherein said diffuser assembly is adapted to maintain carbon dioxide in the pressurized carbonic acid solution by maintaining a backpressure of about 44 to about 55 psi.

3. The diffuser assembly of claim 2 wherein said injector further comprises an outwardly extending flange member spaced between said inlet and outlet ends to couple said injector to the receiver tank.

4. The diffuser assembly of claim 3 further comprising an injector support at least partially defined by a concentric collar member for surrounding a portion of said injector and a second outwardly extending flange member mounted to said collar, said injector support and said injector configured to cooperate with one another to permit said injector to be received and retained in a side wall of the receiver to permit the solution to pass from the exterior to the interior of the receiver, said second outwardly extending flange member of said injector support configured to abut against said outwardly extending flange member of said injector when said injector is retained in the receiver.

* * * * *